US009045004B2

(12) United States Patent
Nagayoshi (10) Patent No.: US 9,045,004 B2
(45) Date of Patent: Jun. 2, 2015

(54) PNEUMATIC TIRE

(75) Inventor: Masatoshi Nagayoshi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/346,150

(22) PCT Filed: Sep. 22, 2011

(86) PCT No.: PCT/JP2011/071687
§ 371 (c)(1),
(2), (4) Date: May 15, 2014

(87) PCT Pub. No.: WO2013/042258
PCT Pub. Date: Mar. 28, 2013

(65) Prior Publication Data
US 2014/0311642 A1    Oct. 23, 2014

(51) Int. Cl.
*B60C 11/13*    (2006.01)
*B60C 9/22*    (2006.01)
*B60C 11/04*    (2006.01)
*B60C 9/28*    (2006.01)
(Continued)

(52) U.S. Cl.
CPC ............ *B60C 9/28* (2013.01); *B60C 2011/0386* (2013.01); *B60C 2011/0341* (2013.01); *B60C 11/042* (2013.01); *B60C 11/04* (2013.01); *B60C 9/2006* (2013.01); *B60C 11/1307* (2013.01); *B60C 2009/2266* (2013.01); *B60C 11/1315* (2013.01); *B60C 11/00* (2013.01)

(58) Field of Classification Search
CPC ........ B60C 2200/04; B60C 9/04; B60C 9/18; B60C 9/20; B60C 9/22; B60C 9/2204; B60C 9/2219; B60C 9/2223; B60C 9/2252; B60C 2001/0066; B60C 11/0008; B60C 2011/0341; B60C 2011/0344; B60C 2011/0353; B60C 2011/0355; B60C 2011/0386; B60C 2011/0388; B60C 2011/039; B60C 11/04; B60C 11/042; B60C 11/13; B60C 11/1307; B60C 11/1315; B60C 11/1323; B60C 11/1353
USPC .............. 152/526, 531, 209.1, 209.3, 209.18, 152/209.23, 209.24, 900, 901
See application file for complete search history.

(56) References Cited

U.S. PATENT DOCUMENTS 3,949,797 A  *  4/1976  Mirtain et al. ........... 152/209.14
4,840,210 A  *  6/1989  Kukimoto ................. 152/209.9
4,905,748 A  *  3/1990  Kukimoto et al. ......... 152/209.5
(Continued)

FOREIGN PATENT DOCUMENTS

JP         5-185808    *   7/1993
JP         H10-035222      2/1998
(Continued)

OTHER PUBLICATIONS

International Search Report dated Jan. 24, 2012, 4 pages, Japan.

*Primary Examiner* — Eric Hug
(74) *Attorney, Agent, or Firm* — Thorpe North & Western (57) ABSTRACT

The pneumatic tire includes a belt layer having a circumferential reinforcing layer. Additionally, the pneumatic tire includes a plurality of circumferential main grooves, and a plurality of land portions partitioned by the circumferential main grooves in a tread portion. The width W1 of the land portion on a tire equatorial plane, and the width W2 of the second land portion at an end portion of the circumferential reinforcing layer have a relationship such that $1.05 \leq W1/W2 \leq 1.30$.

18 Claims, 6 Drawing Sheets

(51) Int. Cl.
*B60C 9/20* (2006.01)
*B60C 11/00* (2006.01)

(56) References Cited

U.S. PATENT DOCUMENTS

| | | | | |
|---|---|---|---|---|
| 4,934,430 | A * | 6/1990 | Koseki et al. | 152/538 |
| 5,240,057 | A * | 8/1993 | Watanabe | 152/531 |
| 5,547,005 | A * | 8/1996 | Ueyoko et al. | 152/209.25 |
| 6,564,841 | B2 * | 5/2003 | Tozawa et al. | 152/209.21 |
| 7,165,588 | B2 * | 1/2007 | Yoshinaka | 152/527 |
| 7,669,624 | B2 * | 3/2010 | Yagita | 152/209.24 |
| 7,779,878 | B2 * | 8/2010 | Isobe | 152/526 |
| 7,823,615 | B2 * | 11/2010 | Suzuki | 152/526 |
| 2010/0116402 | A1 | 5/2010 | Isobe | |

FOREIGN PATENT DOCUMENTS

| | | |
|---|---|---|
| JP | 2009-073337 | 4/2009 |
| JP | 2009-214759 | 9/2009 |
| JP | 2009-262888 | 11/2009 |
| JP | 2011-057183 | 3/2011 |
| WO | WO 2011/090203 | 7/2011 |

* cited by examiner

|  | Conventional Example 1 | Conventional Example 2 | Working Example 1 | Working Example 2 | Working Example 3 | Working Example 4 | Working Example 5 | Working Example 6 | Comparative Example 1 | Comparative Example 2 |
|---|---|---|---|---|---|---|---|---|---|---|
| Circumferential reinforcing layer | No | Present | Present | Present | Present | Present | Present | Present | Present | Present |
| W1/W2 | 1.00 | 1.00 | 1.15 | 1.05 | 1.10 | 1.20 | 1.25 | 1.30 | 1.35 | 1.50 |
| θ1 [°] | 5 | 5 | 8 | 8 | 8 | 8 | 8 | 8 | 8 | 8 |
| θ2 [°] | 5 | 5 | 2 | 2 | 2 | 2 | 2 | 2 | 2 | 2 |
| θ1−θ2 [°] | 0 | 0 | 6 | 6 | 6 | 6 | 6 | 6 | 6 | 6 |
| W3/W2 | 1.00 | 1.00 | 1.20 | 1.20 | 1.20 | 1.20 | 1.20 | 1.20 | 1.20 | 1.20 |
| Uneven wear resistance performance above circumferential reinforcing layer | 90 | 100 | 110 | 105 | 107 | 107 | 106 | 105 | 101 | 100 |
| Uneven wear resistance performance over entire tread portion | 80 | 90 | 110 | 105 | 107 | 107 | 107 | 105 | 103 | 103 |

|  | Working Example 7 | Working Example 8 | Working Example 9 | Working Example 10 | Working Example 11 | Working Example 12 | Working Example 13 | Working Example 14 | Working Example 15 | Working Example 16 |
|---|---|---|---|---|---|---|---|---|---|---|
| Circumferential reinforcing layer | Present | Present | Present | Present | Present | Present | Present | Present | Present | Present |
| W1/W2 | 1.15 | 1.15 | 1.15 | 1.15 | 1.15 | 1.15 | 1.15 | 1.15 | 1.15 | 1.15 |
| θ1 [°] | 2 | 6 | 10 | 25 | 8 | 8 | 20 | 20 | 30 | 30 |
| θ2 [°] | 7 | 5 | 5 | 5 | 2 | 2 | 5 | 5 | 5 | 5 |
| θ1−θ2 [°] | −5 (θ1<θ2) | 1 | 5 | 20 | 6 | 6 | 15 | 15 | 25 | 25 |
| W3/W2 | 1.20 | 1.20 | 1.20 | 1.20 | 1.00 | 1.45 | 1.15 | 1.10 | 1.50 | 1.55 |
| Uneven wear resistance performance above circumferential reinforcing layer | 103 | 105 | 108 | 105 | 108 | 108 | 107 | 105 | 104 | 104 |
| Uneven wear resistance performance over entire tread portion | 100 | 105 | 108 | 105 | 102 | 108 | 105 | 103 | 103 | 102 |

PNEUMATIC TIRE

TECHNICAL FIELD

The present invention relates to a pneumatic tire, and more specifically, to a pneumatic tire having improved uneven wear resistance.

BACKGROUND OF THE INVENTION

Recent pneumatic tires are provided with a circumferential reinforcing layer in a belt layer in order to suppress tire radial growth and reduce uneven wear (in particular, step wear in shoulder land portions). The technology disclosed in Japanese Unexamined Patent Application Publication No. 2011-57183A is a known conventional pneumatic tire that is configured in this manner.

SUMMARY

The present technology provides a pneumatic tire by which uneven wear resistance performance can be improved. A pneumatic tire according to the present invention includes a belt layer that has a circumferential reinforcing layer, and a plurality of circumferential main grooves and a plurality of land portions partitioned by the plurality of circumferential main grooves in a tread portion. In such a pneumatic tire, when the land portion on a tire equatorial plane or each of left and right land portions sandwiching the tire equatorial plane is called a first land portion, and the land portion on an outermost side in a tire width direction among the land portions above the circumferential reinforcing layer is called a second land portion, a width W1 of the first land portion and a width W2 of the second land portion have a relationship such that $1.05 \leq W1/W2 \leq 1.30$.

In the pneumatic tire according to the present invention, a difference in stiffness between the first land portion and the second land portion is properly ensured since the first land portion at the center of the tread portion has a wider structure than the second land portion at an end portion of the circumferential reinforcing layer. As a result, there is an advantage that uneven wear in the first land portion is suppressed and the uneven wear resistance performance of the tire is improved.

BRIEF DESCRIPTION OF THE DRAWINGS

FIG. 7 is a table showing the results of the performance testing of pneumatic tires according to the embodiments of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, a plurality of modified examples that are described in the embodiment can be freely combined within a scope of obviousness for a person skilled in the art.

Pneumatic Tire

Figure 1:
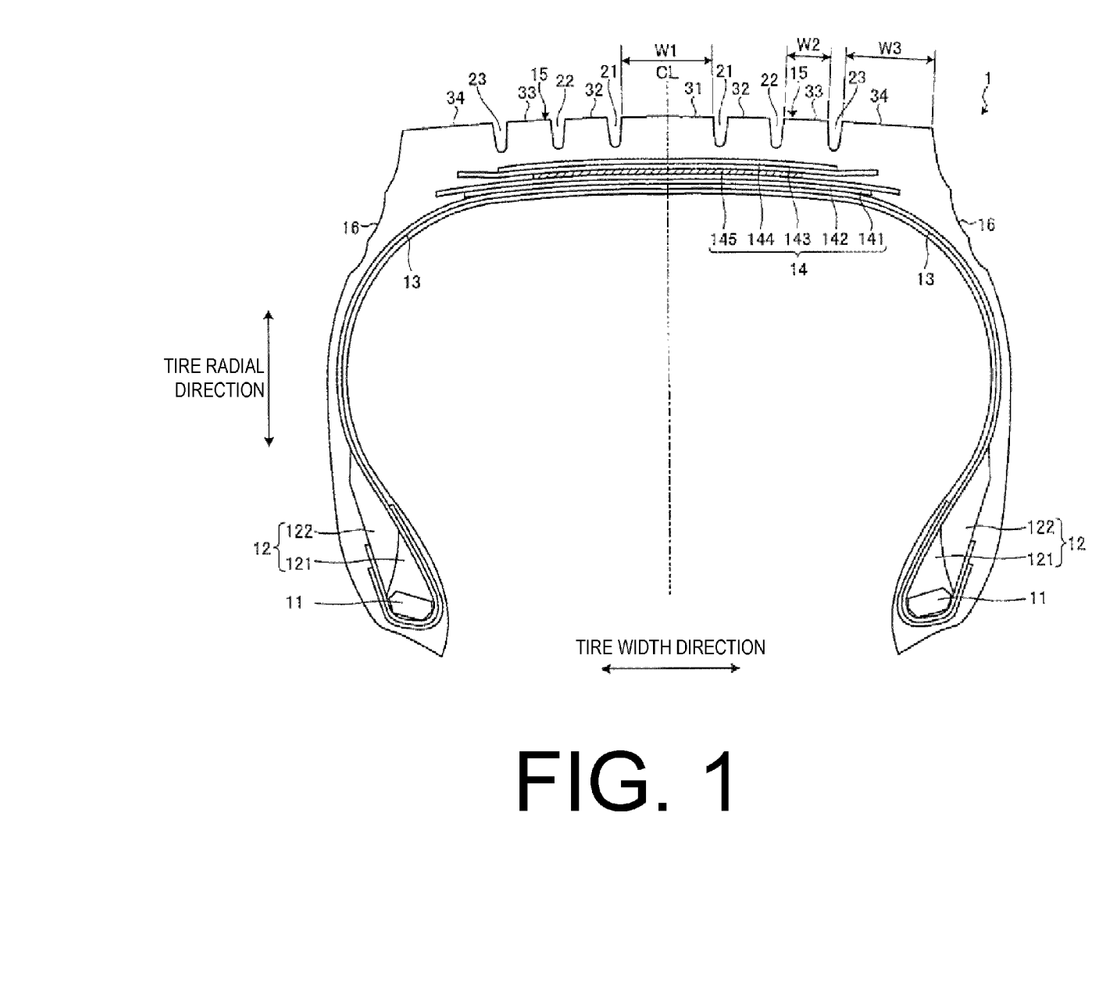
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. As an example of a pneumatic tire 1, FIG. 1 illustrates a radial tire for heavy loads mounted on a long-distance transport truck or bus and the like.

The pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in a tire radial direction so as to reinforce the bead portions. The carcass layer 13 has a single-layer structure, and stretches between the left and right bead cores 11 and 11 in toroidal form, forming a framework for the tire. Additionally, both end portions of the carcass layer 13 are folded toward an outer side in the tire width direction and fixed so as to wrap around the bead cores 11 and the bead fillers 12. The belt layer 14 is formed from a plurality of belt plies 141 to 145 that are laminated, and is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in a tire width direction, so as to form left and right side wall portions of the tire.

Additionally, the pneumatic tire 1 includes a plurality of circumferential main grooves 21 to 23 extending in a tire circumferential direction, a plurality of lug grooves extending in the tire width direction (not illustrated on the drawings), and a plurality of land portions 31 to 34 partitioned by the lug grooves and the circumferential main grooves 21 to 23 in the tread portion. As a result, a tread pattern based on blocks is formed (not illustrated on the drawings). However, the configuration is not limited thereto, and the pneumatic tire 1 may include a rib pattern (not illustrated on the drawings). The circumferential main grooves 21 to 23 may be straight grooves or may be zigzag shaped grooves.

In this embodiment, the pneumatic tire 1 has a left-right symmetric structure centered on a tire equatorial plane CL.

Figure 2:
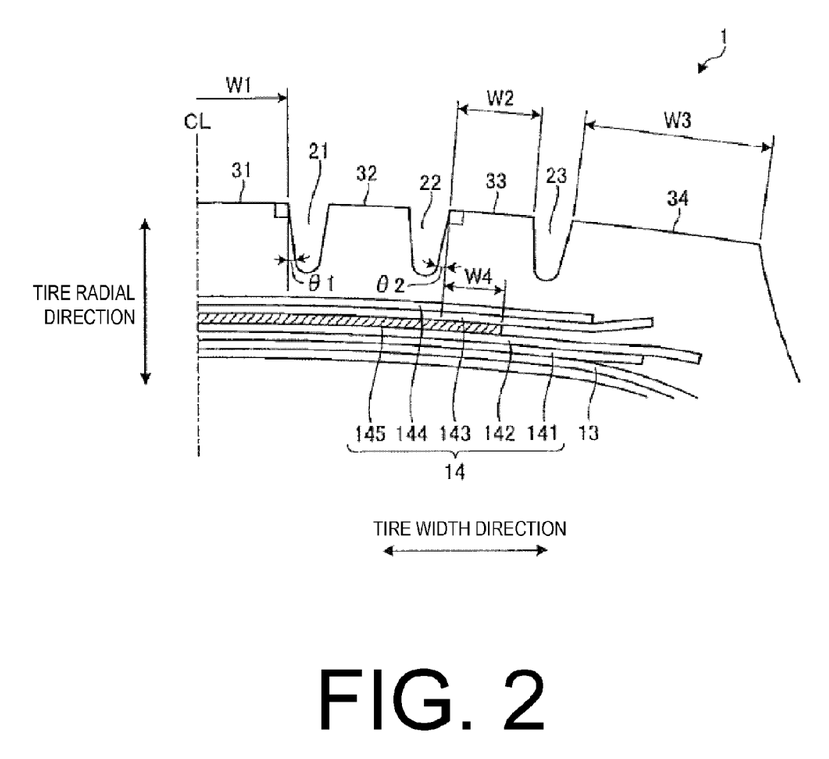
FIG. 2 is an explanatory view illustrating a shoulder portion of the pneumatic tire depicted in FIG. 1.
Figure 3:
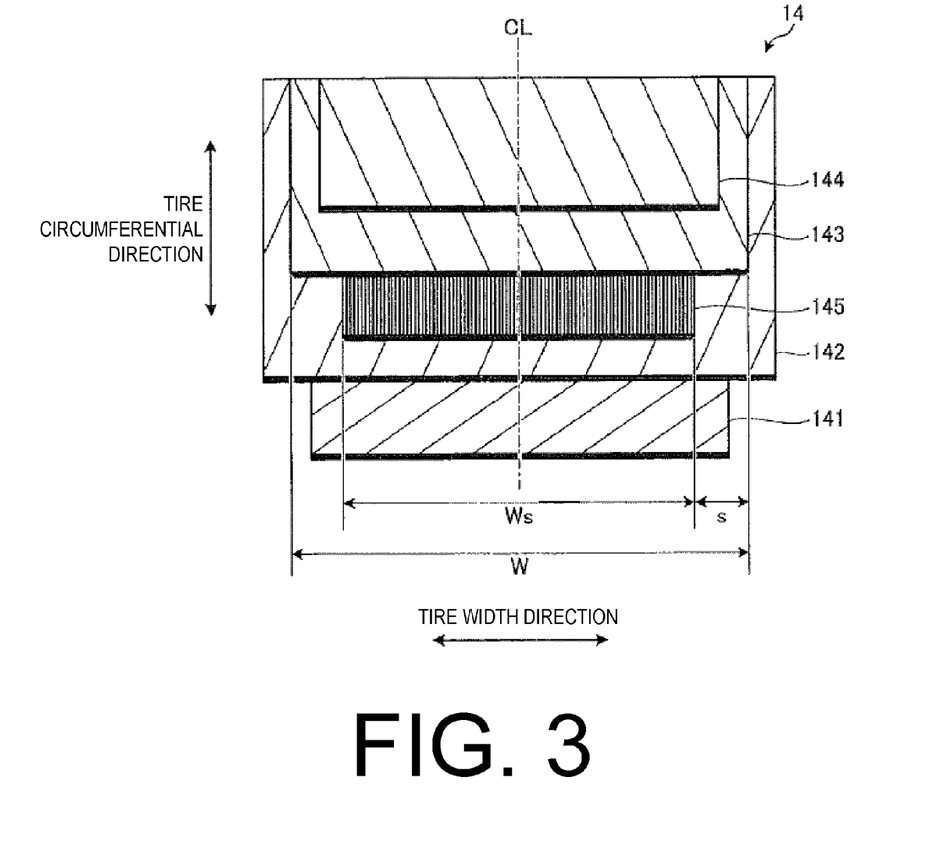
FIG. 3 is an explanatory view illustrating a belt layer of the pneumatic tire depicted in FIG. 1.

FIG. 2 is an explanatory view illustrating a shoulder portion of the pneumatic tire depicted in FIG. 1. FIG. 3 is an explanatory view illustrating a belt layer 14 of the pneumatic tire 1 depicted in FIG. 1. Among these drawings, FIG. 2 illustrates an area on one side of a tread portion demarcated by the tire equatorial plane CL, and FIG. 3 illustrates a laminated structure of the belt layer 14.

Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is configured by a plurality of belt cords formed from steel or organic fibers, covered by coating rubber, and subjected to a rolling process, having a belt angle (angle of inclination of belt cord fiber direction with respect to the tire circumferential direction), as an absolute value, of no less than 40° and no more than 60°. Moreover, the large angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle, as an absolute value, of no less than 10° and no more than 30°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated on the drawings). Moreover, the pair of cross belts 142, 143 are disposed so as to be laminated outward in the tire radial direction of the large angle belt 141.

The belt cover 144 is configured by a plurality of belt cords formed from steel or organic fibers, covered by coating rubber, and subjected to a rolling process, having a belt angle, as an absolute value, of no less than 10° and no more than 45°. Moreover, the belt cover 144 is disposed so as to be laminated outward in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is constituted by belt cords formed from a rubber coated steel wire wound spirally at a slant within a range of ±5° with respect to the tire circumferential direction. Additionally, the circumferential reinforcing layer 145 is disposed so as to be interposed between the pair of cross belts 142, 143. Additionally, the circumferential reinforcing layer 145 is disposed inward in the tire width direction of left and right edges of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability performance is improved.

In the pneumatic tire 1, the belt layer 14 may have an edge cover (not illustrated on the drawings). Generally, the edge cover is configured by a plurality of belt cords formed from steel or organic fibers covered by coating rubber and subjected to a rolling process, having a belt angle, as an absolute value, of no less than 0° and no more than 5°. Additionally, edge covers are disposed outward in the tire radial direction of the left and right edges of the outer-side cross belt 143 (or the inner-side cross belt 142). The edge covers improve the uneven wear resistance performance of the tire by reducing the difference in radial growth between the center area and the shoulder area of the tread portion, by exhibiting a band effect.

Circumferential Reinforcing Layer

Moreover, in the pneumatic tire 1, the belt cords from which the circumferential reinforcing layer 145 is configured are steel wire, and preferably, the number of ends of the circumferential reinforcing layer 145 preferably is no less than 17 ends/50 mm and no more than 30 ends/50 mm. Moreover, the diameter of the belt cord is preferably within a range of no less than 1.2 mm and no more than 2.2 mm. In a configuration in which the belt cords are formed from a plurality of cords twisted together, the belt code diameter is measured as the diameter of a circle that circumscribes the belt cord.

In the pneumatic tire 1, the circumferential reinforcing layer 145 is configured by winding a single steel wire in a spiral manner. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably no more than 12 mm. As a result, a plurality (no less than 2 and no more than 5) of wires can be wound properly at a slant within a range of ±5° with respect to the tire circumferential direction.

Also, in the pneumatic tire 1, (a) the elongation of the belt cords from which the circumferential reinforcing layer 145 is configured when they are components (when they are material prior to forming the green tire) when subjected to a tensile load of 100 N to 300 N is preferably no less than 1.0% and no more than 2.5%. Moreover, (b) the elongation of the belt cords of the circumferential reinforcing layer 145 when in the tire (the state when taken from the tire product) when subjected to a tensile load of 500 N to 1000 N is preferably no less than 0.5% and no more than 2.0%. The belt cords (high elongation steel wire) have a good elongation ratio when a low load is applied compared with normal steel wire, so they have the property that they can withstand the loads that are applied. Therefore, in the case of (a) above, it is possible to improve the durability of the circumferential reinforcing layer 145 during manufacture, and in the case of (b) above, it is possible to improve the durability of the circumferential reinforcing layer 145 when the tire is used, and these points are desirable. The elongation of the belt cords is measured in conformance with JIS G3510.

Also, a width Ws of the circumferential reinforcing layer 145 is preferably within a range such that 0.60≤Ws/W. The width Ws of the circumferential reinforcing layer 145 when the circumferential reinforcing layer 145 has a divided structure (not illustrated on the drawings) is the sum of the widths of each divided portion.

Also, in the configuration illustrated in FIG. 3, the circumferential reinforcing layer 145 is disposed on the inner side in the tire width direction of the left and right edge portions of the narrower cross belt 143 of the pair of cross belts 142, 143. Additionally, the width W of the narrower cross belt 143 and the distance S from the edge portion of the circumferential reinforcing layer 145 to the edge portion of the narrower cross belt 143 are preferably in the range such that 0.03≤S/W. This point is the same even if the circumferential reinforcing layer 145 has a configuration with a divided structure (not illustrated on the drawings). The width W and the distance S are measured as distances in the tire width direction when viewed as a cross-section from the tire meridian direction. Moreover, the upper limit of S/W, although not limited in particular, is restricted by the relationship between the width Ws of the circumferential reinforcing layer 145 and the width W of the narrower cross belt 143.

The width Ws of the circumferential reinforcing layer 145 relative to the tire developed width TDW (not illustrated on the drawings) is preferably within a range such that 0.65≤Ws/TDW≤0.80. The tire developed width TDW refers to a linear distance in a development view between the two ends of tread-patterned portion of the tire assembled on a regular rim and filled with regular internal pressure and no load is applied.

In the configuration illustrated in FIG. 2, the circumferential reinforcing layer 145 is interposed between the pair of cross belts 142, 143 (see FIG. 2). However, the configuration is not limited thereto, and the circumferential reinforcing layer 145 may be disposed on an inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated on the drawings).

[Relationship Between Circumferential Reinforcing Layer and Land Portion Width]

In a configuration in which a circumferential reinforcing layer is provided in the belt layer, as a result of the band effect of the circumferential reinforcing layer, the ground contact length becomes shorter and the ground contact pressure becomes higher. The ground contact pressure increases further in the region where the circumferential reinforcing layer is disposed while the tire is rolling. In this case, there is a problem in that uneven wear occurs between land portions in the region where the circumferential reinforcing layer is disposed.

Therefore, in the pneumatic tire 1, the following configuration is adopted in order to suppress such uneven wear (see FIGS. 1 and 2).

First, a land portion 31 on the tire equatorial plane CL is called a first land portion. A land portion 33 on the outermost side in the tire width direction among the land portions 31 to 33 above the circumferential reinforcing layer 145 is called a second land portion. A land portion 34 on the outer side in the tire width direction of the second land portion 33 is called a third land portion.

In this case, a width W1 of the first land portion 31 and a width W2 of the second land portion 33 have a relationship such that $1.05 \leq W1/W2 \leq 1.30$. That is, the first land portion 31 at the center of the tread portion has a structure that is wider than the second land portion 33 at the end portion of the circumferential reinforcing layer 145. The widths W1, W2 preferably have a relationship such that $1.10 \leq W1/W2 \leq 1.20$.

The width W2 of the second land portion 33 and a width W3 of the third land portion 34 have a relationship such that $1.15 \leq W3/W2 \leq 1.50$. That is, the third land portion on the outer side in the tire width direction of the circumferential reinforcing layer 145 has a structure that is wider than the second land portion 33 at the end portion of the circumferential reinforcing layer 145.

In the above configuration, it is assumed that the pneumatic tire 1 has two or more circumferential main grooves in each of the left and right regions demarcated by the tire equatorial plane CL and has the land portion 34 on the outer side in the tire width direction of the second land portion 33.

If the circumferential main groove 21 is on the tire equatorial plane CL, the left and right land portions 31, 31 (sandwiching the tire equatorial plane CL) partitioned by the circumferential main groove 21 represent the first land portion (not illustrated on the drawings). Both left and right first land portions 31, 31 satisfy the requirements as the above-mentioned first land portion 31.

Regarding the determination of the second land portion, if the width W2 of the land portion 33 and a lap width W4, in which the circumferential reinforcing layer 145 overlaps the road contact surface of the land portion 33 have a relationship such that $0.50 \leq W4/W2$ when viewed as a cross-section from the tire meridian direction, the land portion 33 is considered to be above the circumferential reinforcing layer (see FIG. 3).

The respective widths W1 to W3 of the land portions 31 to 34 are considered linear distances between the left and right edge portions of each of the land portions 31 to 34 as measured when the tire is assembled on a standard rim and inflated to a regular internal pressure, and inflated to a regular air pressure.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular internal pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Moreover, if the edge portion of the land portion 33 has convex and concave shape such as a configuration in which the circumferential main grooves 21 to 23 have a zigzag shape, and a configuration in which the edge portions of the land portions 31 to 34 have notched sections, the respective widths W1 to W3 of the land portions 31 to 34 are measured on the basis of a center point when the edge portions of the land portions 31 to 34 are projected in the tire circumferential direction (not illustrated on the drawings).

Relationship Between Circumferential Reinforcing Layer and Groove Wall Angles

In the pneumatic tire 1, a groove wall angle $\theta 1$ of the edge portion on the outer side of the first land portion 31 in the tire width direction and a groove wall angle $\theta 2$ of the edge portion on the inner side of the second land portion 33 in the tire width direction have a relationship such that $\theta 1 > \theta 2$ (see FIG. 2). That is, the groove wall angle $\theta 1$ of the first land portion 31 at the center of the tread portion is greater than the groove wall angle $\theta 2$ of the second land portion 33 at the end portion of the circumferential reinforcing layer 145.

Note that the groove wall angles $\theta 1$, $\theta 2$ are respectively set to be within a range such that $0° \leq \theta 1 \leq 45°$ and $0° \leq \theta 2 \leq 45°$.

The groove wall angle $\theta 1$ of the first land portion 31 and the groove wall angle $\theta 2$ of the second land portion 33 have a relationship such that $1° \leq \theta 1 - \theta 2 \leq 20°$. The groove wall angles $\theta 1$, $\theta 2$ preferably have a relationship such that $5° \leq \theta 1 - \theta 2 \leq 10°$.

The groove wall angles $\theta 1$, $\theta 2$ are measured as angles formed from the groove wall surface and a line that passes through the edge portion of the land portion and is perpendicular to the road contact surface of the land portion when viewed as a cross-section from the tire meridian direction (see FIG. 2).

The groove wall angles $\theta 1$, $\theta 2$ and the below-mentioned widths W1 to W3 are measured in a state where the tire is assembled on a standard rim and inflated to a regular internal pressure under no load. In this case, the following measurement method is, for example, used. First, a tire unit is applied to the imaginary line of a tire profile measured by a laser profiler and fixed with tape or the like. Then, the gauge that is to be measured is measured with a caliper or the like. The laser profiler used here is a tire profile measuring device (manufactured by Matsuo Co., Ltd.).

Figure 4:
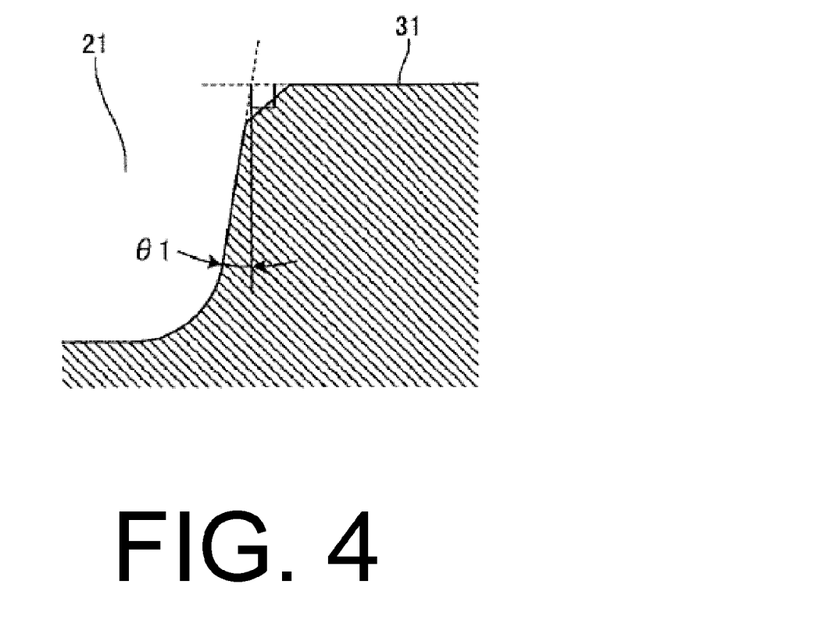
FIG. 4 is an explanatory view illustrating a groove wall angle of a circumferential main groove.

As illustrated in FIG. 4, when a chamfered portion is provided on the edge portion of the land portion, an intersection is taken of the imaginary line extended from the road contact surface of the land portion and the imaginary line extended from the groove wall surface so that the groove wall angle becomes an angle formed between the groove wall surface and a line passing through the intersection and perpendicular to the road contact surface of the rib.

Figure 5:
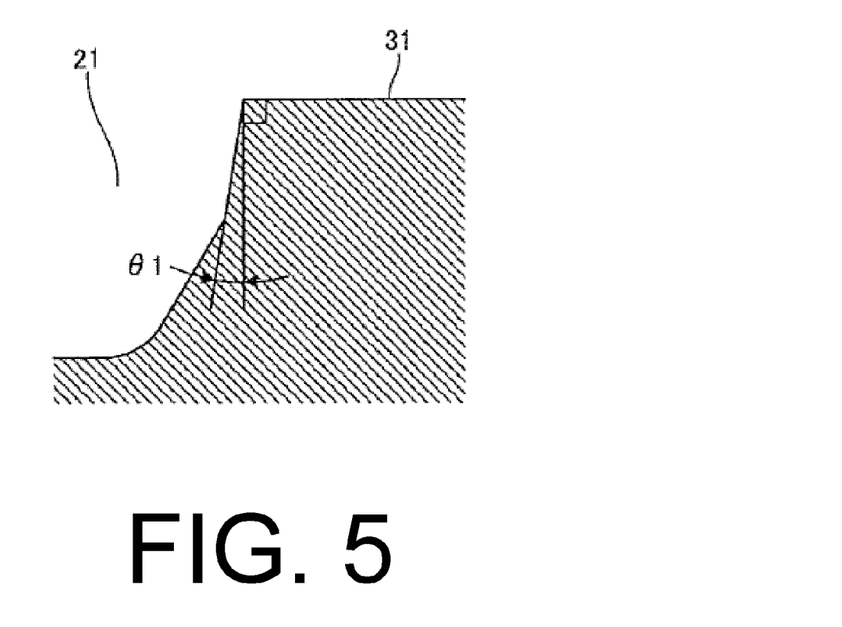
FIG. 5 is an explanatory view illustrating a groove wall angle of a circumferential main groove.

Moreover, in a configuration having a multi-step structure in which the angle of inclination of the groove wall changes in the groove depth direction as illustrated in FIG. 5, the groove wall angle of the groove wall portion closest to the groove opening is used.

Figure 6:
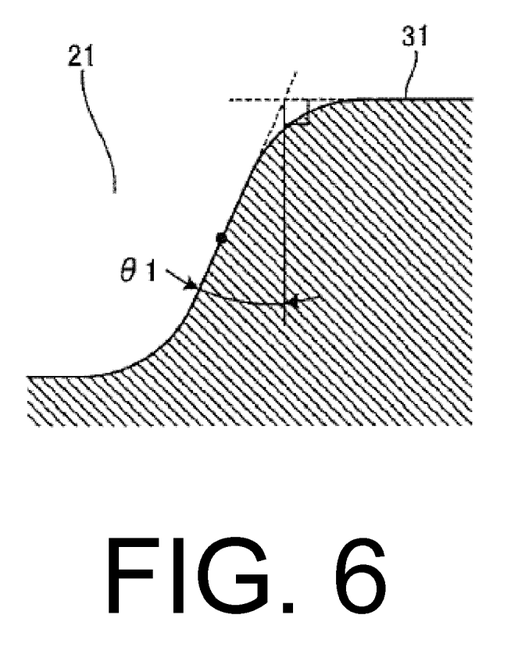
FIG. 6 is an explanatory view illustrating a groove wall angle of a circumferential main groove.

Moreover, in a configuration in which the groove wall surface is composed of a plurality of continuous arcs when viewed as a cross-section from the tire meridian direction as illustrated in FIG. 6, an intersection is taken of a tangent from the inflection point of the groove wall section closest to the groove opening and of the imaginary line extending from the road contact surface of the land portion. The groove wall angle then becomes an angle formed between the tangent from the inflection point and a line passing through the intersection and perpendicular to the road contact surface of the rib.

Moreover, if the edge portion of the land portion 33 has convex and concave shapes such as a configuration in which the circumferential main grooves 21 to 23 have a zigzag shape, and a configuration in which the edge portions of the land portions 31 to 34 have notched sections, the groove wall angles $\theta 1$, $\theta 2$ are measured at positions in which the respective widths W1 to W3 of the land portions 31 to 34 are the greatest (not illustrated on the drawings).

EFFECT

As described above, the pneumatic tire 1 includes the belt layer 14 having the circumferential reinforcing layer 145 (see FIGS. 1 and 2). Additionally, the pneumatic tire 1 includes a plurality of circumferential main grooves 21 to 23, and a plurality of land portions 31 to 34 partitioned by the circumferential main grooves 21 to 23 in the tread portion. The width W1 of the land portion 31 (or the left and right land portions 31 sandwiching the tire equatorial plane CL) on the tire equatorial plane CL, and the width W2 of the second land portion at the end portion of the circumferential reinforcing layer have a relationship such that $1.05 \leq W1/W2 \leq 1.30$.

With such a configuration, the first land portion 31 at the center of the tread portion has a wider structure than the second land portion 33 at the end portion of the circumferential reinforcing layer 145. Therefore, the difference in stiffness between the first land portion 31 and the second land portion 33 is properly ensured. As a result, this has the advantage that uneven wear in the first land portion 31 is suppressed and the uneven wear resistance performance of the tire is improved.

In the pneumatic tire 1, a groove wall angle $\theta 1$ of the edge portion on the outer side of the first land portion 31 in the tire width direction and a groove wall angle $\theta 2$ of the edge portion on the inner side of the second land portion 33 in the tire width direction have a relationship such as $\theta 1 > \theta 2$ (see FIG. 2). With such a configuration, the groove wall angle $\theta 1$ of the first land portion 31 at the center of the tread portion is greater than the groove wall angle $\theta 2$ of the second land portion 33 at the end portion of the circumferential reinforcing layer 145. Therefore, the difference in stiffness between the first land portion 31 and the second land portion 33 is properly ensured. As a result, this has the advantage that uneven wear in the first land portion 31 is suppressed and the uneven wear resistance performance of the tire is improved.

In the pneumatic tire 1, the groove wall angle $\theta 1$ of the first land portion 31 and the groove wall angle $\theta 2$ of the second land portion 33 have a relationship such that $1° \leq \theta 1 - \theta 2 \leq 20°$ (see FIG. 2). As a result, this has the advantage that the difference in stiffness between the first land portion 31 and the second land portion 33 is made appropriate and uneven wear in the first land portion 31 is suppressed.

In the pneumatic tire 1, the width W2 of the second land portion 33 and the width W3 of the third land portion 34 have a relationship such that $1.15 \leq W3/W2 \leq 1.50$ (see FIG. 2). With such a configuration, the third land portion on the outer side of the circumferential reinforcing layer 145 in the tire width direction has a structure that is wider than the second land portion 33 at the end portion of the circumferential reinforcing layer 145. Therefore, the difference in stiffness between the second land portion 33 and the third land portion 34 due to the disposition of the circumferential reinforcing layer 145 is mitigated. As a result, this has the advantage that the uneven wear resistance performance of the tire is improved. In the pneumatic tire 1, the belt layer 14 is provided with the large angle belt 141, the pair of cross belts 142, 143 disposed on the outer side of the large angle belt 141 in the tire radial direction, the belt cover 144 disposed on the outer side of the pair of cross belts 142, 143 in the tire radial direction, and the circumferential reinforcing layer 145 disposed between the pair of cross belts 142, 143, on the inner side of the pair of cross belts 142, 143 in the tire radial direction, or on the inner side of the large angle belt 141 in the tire radial direction (see FIGS. 2 and 3). By applying this pneumatic tire 1 having such a configuration, there is the advantage in that a noticeable improvement in tire uneven wear resistance performance is achieved.

Moreover, in the pneumatic tire 1, the belt cords from which the circumferential reinforcing layer 145 is configured are steel wire, and the number of ends of the circumferential reinforcing layer 145 is no less than 17 ends/50 mm and no more than 30 ends/50 mm.

Also, in the pneumatic tire 1, the elongation of the belt cords from which the circumferential reinforcing layer 145 is configured when they are components when subjected to a tensile load of 100 N to 300 N is no less than 1.0% and no more than 2.5%.

In the pneumatic tire 1, the elongation of the belt cords from which the circumferential reinforcing layer 145 is configured when they are in the tire when subjected to a tensile load of 500 N to 1000 N is no less than 0.5% and no more than 2.0%.

In the pneumatic tire 1, the circumferential reinforcing layer 145 is disposed inward in the tire width direction of the left and right edge portions of the narrower cross belt 143 of the pair of cross belts 142, 143 (see FIG. 3). Additionally, the width W of the narrower cross belt 143 and the distance S from an edge portion of the circumferential reinforcing layer 145 to an edge portion of the narrower cross belt 143 are in the range of $0.03 \leq S/W$. In such a configuration, there is an advantage in that the positional relationship S/W between the edge portions of the cross belts 142, 143 and the edge portions of the circumferential reinforcing layer 145 is made appropriate to reduce the strain that is produced in the rubber material around the circumferential reinforcing layer 145.

In the pneumatic tire 1, the width W of the narrower cross belt 143 and the width Ws of the circumferential reinforcing layer 145 are within the range such that $0.60 \leq Ws/W$.

In the pneumatic tire 1, the width Ws of the circumferential reinforcing layer 145 relative to the tire developed width TDW (not illustrated on the drawings) is within the range such that 0.65≤Ws/TDW≤0.80. In such a configuration, the width Ws and the tire developed width TDW are in the range such that Ws/TDW≤0.80, so the width Ws of the circumferential reinforcing layer 145 is made appropriate. This has the advantage that fatigue failure of the belt cords is suppressed at the end portion of the circumferential reinforcing layer 145. Also, the width Ws and the tire developed width TDW are in the range such that 0.65≤Ws/TDW, this has the advantage that the ground contact shape of the tire is made appropriate, and the tire uneven wear resistance performance is improved.

Target of Application

It is preferable that the pneumatic tire 1 be applied for a heavy-duty tire. A heavy duty tire has a higher load under use than a passenger tire. Thus, uneven wear in the shoulder land portion occurs easily since a radial difference becomes large between the region where the circumferential reinforcing layer is disposed and the region on the outer side of the circumferential reinforcing layer in the tire width direction. Thus, a noticeable suppression effect in uneven wear resistance is achieved by applying the present invention to such a heavy duty tire.

The pneumatic tire 1 is preferably applied to a tire with an aspect ratio of no less than 40% or no more than 70% when assembled on a regular rim, inflated to the regular internal pressure and put under the regular load. Furthermore, the pneumatic tire 1 is preferably used as a heavy duty pneumatic tire for buses and trucks as in this embodiment. With a tire having such an aspect ratio (in particular, heavy duty pneumatic tires for buses and trucks), uneven wear in the shoulder land portion occurs easily since the ground contact shape easily becomes an hourglass shape. Thus, a noticeable suppression effect in uneven wear resistance is achieved by applying the present invention to a tire with such an aspect ratio.

The pneumatic tire 1 is preferably applied to a tire having a tire ground contact edge at the edge portions on the outer side of the shoulder land portion 34 in the tire width direction as illustrated in FIG. 2. With such a configuration, uneven wear occurs easily at the edge portions of the shoulder land portion 34. Thus, a noticeable suppression effect in uneven wear resistance is achieved by applying the present invention to a tire with such a configuration. The tire ground contact edge is measured when the tire is assembled on a standard rim and inflated to a regular internal pressure, and inflated to the regular internal air pressure.

EXAMPLES

FIG. 7 is a table showing the results of performance testing of pneumatic tires according to the embodiments of the present invention.

In the performance tests, evaluations of (1) uneven wear resistance performance above the circumferential reinforcing layer and (2) uneven wear resistance performance over the entire region of the tread portion were conducted for the plurality of different pneumatic tires (see FIG. 7). Pneumatic tires with a tire size of 445/50R22.5 were assembled on a rim with a rim size of 22.5×14.00 and the pneumatic tires were provided with an air pressure of 900 kPa and a load of 4625 kg/tire. The pneumatic tires were mounted on a 6×4 tractor and trailer used as a test vehicle.

(1) In the evaluations concerning uneven wear resistance performance above the circumferential reinforcing layer, the test vehicle traveled 50,000 km on regular paved roads, and then the difference between the amount of wear in the first land portion and the amount of wear in the second land portion was measured. Evaluations were performed by indexing the measurement results with Conventional Example 2 as the standard score (100). In the evaluations, the higher the numerical value the better, and a numerical value of 103 or greater demonstrates superiority.

(2) In the evaluations concerning uneven wear resistance performance over the entire tread portion, the test vehicle traveled 100,000 km on regular paved roads, and then the difference between the amount of wear of the left and right edge portions of the shoulder land portion was measured. Evaluations were performed by indexing the measurement results with Conventional Example 2 as the standard score (100). In this evaluation, higher scores were preferable.

The pneumatic tires 1 of Working Examples 1 to 16 had the structure depicted in FIG. 1, including six circumferential main grooves 21 to 23 and seven rows of land portions 31 to 34 disposed with left-right symmetry centered on the tire equatorial plane CL. The depth of the circumferential main grooves 21 to 23 was set to be 11.8 mm. The width W2 of the second land portion 33 was set to be 36 mm. The pneumatic tire of the Conventional Example 1 does not have the circumferential reinforcing layer in the configuration illustrated in FIG. 1. As a result, the second land portion and the third land portion are assumed to be in the same position as the Working Example 1. In the pneumatic tire of the Conventional Example 2, the width W1 of the first land portion 31, the width W2 of the second land portion 33, and the width W3 of the third land portion 34 were set to be W1=W2=W3 in the configuration illustrated in FIG. 1.

As shown in the test results, the pneumatic tires 1 of the Working Examples 1 to 16 demonstrate improved tire uneven wear resistance performance.

What is claimed is:

1. A pneumatic tire comprising a belt layer that has a circumferential reinforcing layer, and a plurality of circumferential main grooves and a plurality of land portions partitioned by the circumferential main groove in a tread portion; wherein, a land portion on a tire equatorial plane or each of left and right land portions sandwiching the tire equatorial plane is a first land portion, and a land portion on an outermost side in a tire width direction among the plurality of land portions above the circumferential reinforcing layer is a second land portion, a width W1 of the first land portion and a width W2 of the second land portion have a relationship such that 1.05≤W1/W2≤1.30; and a groove wall angle θ1 of an edge portion on an outer side of the first land portion in the tire width direction and a groove wall angle θ2 of an edge portion on an inner side of the second land portion in the tire width direction have a relationship such that 1°≤θ1−θ2≤20°.

2. The pneumatic tire according to claim 1, wherein, a land portion on the outer side in the tire width direction of the second land portion is a third land portion, and the width W2 of the second land portion and a width W3 of the third land portion have a relationship such that 1.15≤W3/W2≤1.50.

3. The pneumatic tire according to claim 1, wherein the belt layer includes a large angle belt, a pair of cross belts disposed on the outer side of the large angle belt in a tire radial direction, a belt cover disposed on the outer side of the pair of cross belts in the tire radial direction, and the circumferential reinforcing layer disposed between the pair of cross belts, on the inner side of the pair of cross belts in the tire radial direction or on the inner side of the large angle belt in the tire radial direction.

4. The pneumatic tire according to claim 1, wherein the belt cords that configure the circumferential reinforcing layer are steel wire, and a number of ends of the circumferential reinforcing layer is no less than 17 ends/50 mm and no more than 30 ends/50 mm.

5. The pneumatic tire according to claim 1, wherein elongation of the belt cords that configures the circumferential reinforcing layer when they are components when subjected to a tensile load of 100 N to 300 N is no less than 1.0% and no more than 2.5%.

6. The pneumatic tire according to claim 1, wherein elongation of the belt cords that configure the circumferential reinforcing layer when in the tire when subjected to a tensile load of 500 N to 1000 N is no less than 0.5% and no more than 2.0%.

7. The pneumatic tire according to claim 1, wherein the circumferential reinforcing layer is disposed on the inner side in the tire width direction of left and right edge portions of a narrower cross belt of the pair of cross belts, and a width W of the narrower cross belt and a distance S from an edge portion of the circumferential reinforcing layer to an edge portion of the narrower cross belt are within a range such that $0.03 \leq S/W$.

8. The pneumatic tire according to claim 1, wherein the circumferential reinforcing layer is disposed on the inner side in the tire width direction of left and right edge portions of the narrower cross belt of the pair of cross belts, and the width W of the narrower cross belt and a width Ws of the circumferential reinforcing layer are within a range such that $0.60 \leq Ws/W$.

9. The pneumatic tire according to claim 1, wherein the width Ws of the circumferential reinforcing layer relative to a tire developed width TDW is within a range such that $0.65 \leq Ws/TDW \leq 0.80$.

10. The pneumatic tire according to claim 1, wherein the pneumatic tire has an aspect ratio of 70% or less.

11. The pneumatic tire according to claim 2, wherein the belt layer includes a large angle belt, a pair of cross belts disposed on the outer side of the large angle belt in a tire radial direction, a belt cover disposed on the outer side of the pair of cross belts in the tire radial direction, and the circumferential reinforcing layer disposed between the pair of cross belts, on the inner side of the pair of cross belts in the tire radial direction or on the inner side of the large angle belt in the tire radial direction.

12. The pneumatic tire according to claim 11 wherein the belt cords that configure the circumferential reinforcing layer are steel wire, and a number of ends of the circumferential reinforcing layer is no less than 17 ends/50 mm and no more than 30 ends/50 mm.

13. The pneumatic tire according to claim 12, wherein elongation of the belt cords that configures the circumferential reinforcing layer when they are components when subjected to a tensile load of 100 N to 300 N is no less than 1.0% and no more than 2.5%.

14. The pneumatic tire according to claim 13, wherein elongation of the belt cords that configure the circumferential reinforcing layer when in the tire when subjected to a tensile load of 500 N to 1000 N is no less than 0.5% and no more than 2.0%.

15. The pneumatic tire according to claim 14, wherein the circumferential reinforcing layer is disposed on the inner side in the tire width direction of left and right edge portions of a narrower cross belt of the pair of cross belts, and a width W of the narrower cross belt and a distance S from an edge portion of the circumferential reinforcing layer to an edge portion of the narrower cross belt are within a range such that $0.03 \leq S/W$.

16. The pneumatic tire according to claim 15, wherein the circumferential reinforcing layer is disposed on the inner side in the tire width direction of left and right edge portions of the narrower cross belt of the pair of cross belts, and the width W of the narrower cross belt and a width Ws of the circumferential reinforcing layer are within a range such that $0.60 \leq Ws/W$.

17. The pneumatic tire according to claim 16, wherein the width Ws of the circumferential reinforcing layer relative to a tire developed width TDW is within a range such that $0.65 \leq Ws/TDW \leq 0.80$.

18. The pneumatic tire according to claim 17, wherein the pneumatic tire has an aspect ratio of 70% or less.

\* \* \* \* \*